(12) United States Patent
Behling et al.

(10) Patent No.: US 12,246,637 B2
(45) Date of Patent: Mar. 11, 2025

(54) VEHICLE FOR TRANSPORTING CARGO

(71) Applicant: Fraunhofer-Gesellschaft zur Foerderung der Angewandten Forschung e.V., Munich (DE)

(72) Inventors: Jan Behling, Munich (DE); Mathias Rotgeri, Munich (DE); Jan Soeren Emmerich, Munich (DE); Dirk Hoening, Munich (DE); Patrick Klokowski, Munich (DE); Christian Hammermeister, Munich (DE); Michael Ten Hompel, Munich (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 655 days.

(21) Appl. No.: 17/635,055

(22) PCT Filed: Jul. 20, 2020

(86) PCT No.: PCT/EP2020/070407
§ 371 (c)(1),
(2) Date: Feb. 14, 2022

(87) PCT Pub. No.: WO2021/032383
PCT Pub. Date: Feb. 25, 2021

(65) Prior Publication Data
US 2022/0281375 A1    Sep. 8, 2022

(30) Foreign Application Priority Data

Aug. 16, 2019 (DE) ............... 10 2019 122 052.1

(51) Int. Cl.
*B60P 7/08* (2006.01)

(52) U.S. Cl.
CPC ........... *B60P 7/0807* (2013.01); *B60P 7/0892* (2013.01)

(58) Field of Classification Search
CPC ............ G05B 19/41895; G05B 19/416; B60P 7/0807; B60P 7/0892; B60P 7/135; G05D 1/618
(Continued)

(56) References Cited

U.S. PATENT DOCUMENTS

| 5,109,971 | A | 5/1992 | Riner |
| 5,360,308 | A | 11/1994 | Hansen |

(Continued)

FOREIGN PATENT DOCUMENTS

| CN | 204324434 U | 5/2015 |
| CN | 105538326 A | 5/2016 |

(Continued)

OTHER PUBLICATIONS

International Search Report of PCT/EP2020/070407, mailed Oct. 23, 2020.
(Continued)

*Primary Examiner* — Stephen T Gordon
(74) *Attorney, Agent, or Firm* — Collard & Roe, P.C.

(57) ABSTRACT

A vehicle for transporting cargo includes a cargo receiving portion which is located on a chassis, the cargo receiving portion having a retaining element that secures the cargo at the edge of the cargo receiving portion and a vehicle control unit being provided. The retaining element extends only over part of the perimeter of the cargo receiving portion and is designed to rotate about a vertical axis, the vehicle control unit being configured such that, as a result of each current or anticipated acceleration or deceleration of the chassis, it orients the retaining element about the vertical axis, relative to the current direction of travel, so that the retaining
(Continued)

Figure 1:
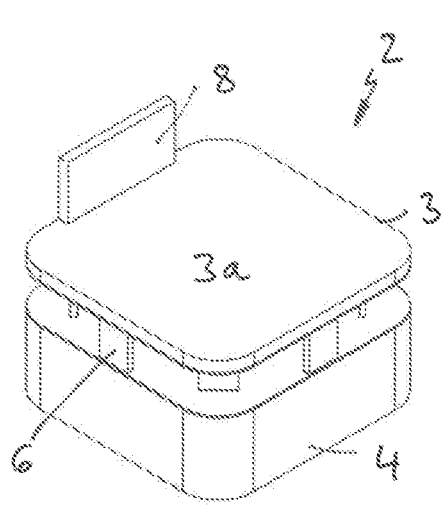

element is at least on the side of the cargo receiving portion towards which the cargo moves after overcoming the static friction between the surface of the load receiving portion and the contact surface of the load.

10 Claims, 4 Drawing Sheets

(58) Field of Classification Search
USPC .......................................................... 701/124
See application file for complete search history.

(56) References Cited

U.S. PATENT DOCUMENTS

| | | | | |
|---|---|---|---|---|
| 9,222,854 | B2* | 12/2015 | Singh | .................... G01M 17/06 |
| 2011/0106362 | A1 | 5/2011 | Seitz | |
| 2014/0255137 | A1 | 9/2014 | Haertel et al. | |
| 2015/0367769 | A1* | 12/2015 | Gift | ...................... B60P 7/0892 |
| | | | | 296/43 |
| 2020/0102156 | A1* | 4/2020 | Lwali | ..................... B65G 47/74 |
| 2020/0339348 | A1 | 10/2020 | Durai | |
| 2021/0247774 | A1 | 8/2021 | Hotta et al. | |
| 2022/0289505 | A1 | 9/2022 | Behling et al. | |

FOREIGN PATENT DOCUMENTS

| | | |
|---|---|---|
| CN | 208018986 U | 10/2018 |
| DE | 694 04 649 T2 | 2/1998 |
| DE | 10 2005 049 159 A1 | 5/2006 |
| DE | 10 2008 030 546 A1 | 12/2009 |
| DE | 10 2008 039 764 B4 | 11/2010 |
| DE | 20 2012 010 247 U1 | 10/2013 |
| DE | 10 2015 118 313 A1 | 4/2017 |
| DE | 10 2015 114 370 B4 | 3/2018 |
| DE | 10 2019 122 055 A1 | 2/2021 |
| EP | 2 093 642 A1 | 8/2009 |
| EP | 3 378 769 A1 | 9/2018 |
| WO | 2022/096185 A1 | 5/2022 |

OTHER PUBLICATIONS

International Search Report of PCT/EP2020/072260, mailed Oct. 28, 2020.

* cited by examiner

VEHICLE FOR TRANSPORTING CARGO

CROSS REFERENCE TO RELATED APPLICATIONS

This application is the National Stage of PCT/EP2020/070407 filed on Jul. 20, 2020, which claims priority under 35 U.S.C. § 119 of German Application No. 10 2019 122 052.1 filed on Aug. 16, 2019, the disclosure of which is incorporated by reference. The international application under PCT article 21(2) was not published in English.

The invention relates to a vehicle for transporting cargo, having a cargo holder that is arranged on a chassis, wherein the cargo holder has a retaining element that secures the cargo at the edge of the cargo holder, and wherein a vehicle control system is provided.

In the case of transport systems, above all in the case of faster transport systems (driverless transport vehicles or rail-guided systems), it is necessary to secure the cargo so that it does not fall down during acceleration, braking and curve maneuvers. In this regard, contradictory demands are made on load securing:

On the one hand, reliable load securing should be guaranteed toward all sides, and on the other hand, load securing should be as simple as possible and thereby cost-advantageous, and finally, load securing should be as compatible as possible with simple weight transfer concepts and allow good accessibility to the cargo.

To solve these problems, vehicles are known that have a cargo holder having a low friction value and shape-fit load securing, which are formed by a metal sheet that runs around the edge of the cargo holder, as a retaining element. Furthermore, vehicles are known in which load securing takes place in that the support surface of the cargo holder has a high friction value, which prevents unwanted slipping of the cargo.

Fundamentally, movable lateral shape-fit load-securing elements can also be used, which can be activated and deactivated, for example flaps that can be affixed laterally and opened. However, such load-securing elements are complicated and therefore not cost-advantageous.

From DE 10 2008 030 546 A1, an autonomous conveying vehicle is known, the travel movements of which are adapted to the freight loaded onto it, so that slipping or falling down is prevented.

It is the task of the invention to create a vehicle that allows reliable load securing with the least possible effort and good accessibility to the cargo.

This task is accomplished, in the case of a vehicle of the type indicated initially, according to the invention, in that the retaining element extends over only a partial region of the circumference of the cargo holder, and is configured to rotate about a vertical axis, wherein the vehicle control system is set up in such a manner that it orients the retaining element, in each instance, on the basis of a current or expected acceleration or deceleration of the chassis, relative to the current direction of travel, about the vertical axis, so that the retaining element is situated at least on the side of the cargo holder toward which the cargo moves after overcoming the adhesion friction between the surface of the cargo holder and the contact surface of the cargo. In this regard, the retaining element can also be an integral component of the cargo holder, which is then configured in one piece. This holder is then configured in a cup shape, for example, wherein the formed-on retaining element extends only over a partial region of the circumference of the cargo holder.

Load securing is thereby achieved with shape fit, by means of a retaining element that extends only over a partial region of the circumference of the cargo holder, for example is arranged only on one side of the cargo holder. In this regard, the retaining element is positioned by the vehicle control system, by means of rotation about the vertical axis, in such a manner that it is always situated on the side toward which the cargo is moving on the basis of an acceleration or deceleration. The vehicle control system thereby actively controls the orientation of the retaining element; for example, the retaining element is situated at the rear, viewed in the direction of travel, in the case of an expected strong positive acceleration, at the front in the case of expected strong braking, and laterally on the outside in the direction of centrifugal force in the case of rapid travel through a curve. In this regard, the retaining element can be rotated about the vertical axis in different ways.

According to a first preferred embodiment, it is provided that the cargo holder can be rotated about the vertical axis relative to the chassis. In this regard, the retaining element is firmly connected with the cargo holder, and the cargo holder, with the retaining element, is positioned by the vehicle control system in such a manner that the retaining element is situated in the correct location.

In a second preferred embodiment, it is provided that the chassis is an omni-directional chassis. In this embodiment, the chassis itself is controlled by the vehicle control system, putting it into the corresponding position of rotation, in such a manner that the retaining element is situated in the correct position without itself being rotated relative to the chassis.

Alternatively, it is fundamentally also possible that the retaining element is arranged so as to rotate relative to the cargo holder. Combinations of the embodiments described above are also possible.

In a further advantageous embodiment, it is provided that the vehicle control system determines the acceleration or deceleration that is expected, in each instance, from a route that is known to the vehicle control system. In the case of a preferably driverless vehicle, then either the route or only the travel destination is input into the vehicle control system, and from this the vehicle control system determines the route on its own. Based on this route and the accelerations or decelerations that are known from it, a corresponding orientation of the retaining element by means of the vehicle control system is then continuously possible.

In addition or alternatively, it is provided that the vehicle control system is connected with an acceleration sensor placed on the vehicle, and controls the orientation of the retaining element on the basis of the current acceleration or deceleration, in each instance, as detected by the acceleration sensor.

In a further advantageous embodiment, it is provided that the retaining element is configured so that it can be lowered at least to the level of the surface of the cargo holder, which allows good accessibility of the cargo holder for removal of the cargo or for placing cargo on the cargo holder.

In this regard, the retaining element can be articulated onto the cargo holder or, if applicable, also onto the chassis (if it is omni-directional), so as to pivot or, alternatively, so as to be moved vertically.

The retaining element can have fundamentally any desired shape, with adaptation to the cargo holder; preferably it is configured so as to be C-shaped or rib-shaped in cross-section.

Finally, the retaining element can also be configured in multiple parts.

The invention is explained in greater detail below, as an example, using the drawing. This drawing shows, in a perspective representation, in each instance, in FIG. 1 a schematic representation of a vehicle according to the invention, in accordance with a first embodiment, FIG. 2 a schematic representation of a vehicle in accordance with a second embodiment, FIG. 3 a schematic representation of a vehicle in accordance with a third embodiment, FIG. 4 an exploded representation of the vehicle according to FIG. 3, FIG. 5 the vehicle according to FIG. 1, with the retaining element in the load-securing position, FIG. 6 the vehicle according to FIG. 5, with the retaining element lowered by means of pivoting, FIG. 7 the vehicle according to FIG. 5, with a modified retaining element in the load-securing position, FIG. 8 the vehicle according to FIG. 7, with the retaining element moved vertically downward, FIG. 9 the vehicle according to FIG. 3 during acceleration, FIG. 10 the vehicle according to FIG. 9 in normal travel, FIG. 11 the vehicle according to FIG. 10 during travel along a curve, and FIG. 12 the vehicle according to FIG. 11 after termination of the travel along a curve.

A preferably driverless vehicle for transport of cargo 1 is indicated, in general, with 2 in the figures. The vehicle 2 has a planar cargo holder 3, on which the cargo 1 is placed for transport. The cargo holder 3 consists of metal or plastic, for example; its surface is flat and not provided with an additional friction-increasing coating or the like, so as to take on or give up the cargo 1 in a simple manner, preferably from the side by means of shifting it. The vehicle 2 furthermore has a chassis, indicated in general with 4, on the underside of which castors 5 or travel wheels are indicated.

In the case of the exemplary embodiments shown, the cargo holder 3 is not arranged directly on the chassis 4, but rather an intermediate body 6 is arranged between the top side of the chassis 4 and the underside of the cargo holder 3. This intermediate body 6 is structured in such a manner that the cargo holder 3 is configured so as to rotate about a vertical axis 7, relative to the chassis 4, by way of a pivot drive, not shown. For this purpose, either the intermediate body 6 can be configured to rotate relative to the chassis 4, or the cargo holder 3 can be configured to rotate relative to the intermediate body 6.

To secure the cargo 1 on the cargo holder 3, a retaining element 8 is provided, which extends only over a partial region of the circumference of the cargo holder 3.

In the exemplary embodiment according to FIG. 1, the retaining element 8 is configured with a rib shape in cross-section, and extends only on one side of the cargo holder 3.

Figure 2:
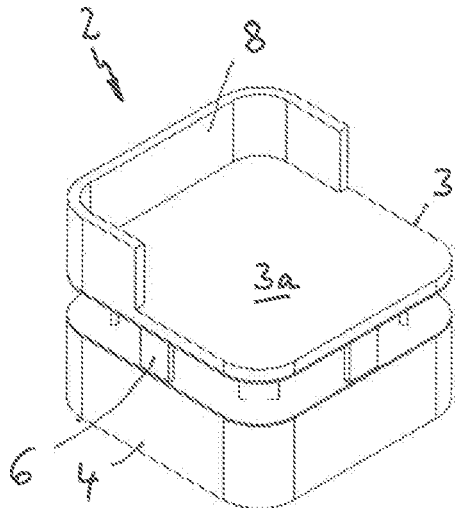

Alternatively, in accordance with FIG. 2, it can also be provided that the retaining element also indicated with 8 is configured in C shape in cross-section, in other words it is extended in arc shape, in the corner regions, relative to the retaining element 8 in accordance with FIG. 1, and thereby extends into the adjacent side walls of the cargo holder 3 in certain regions.

Figure 3:
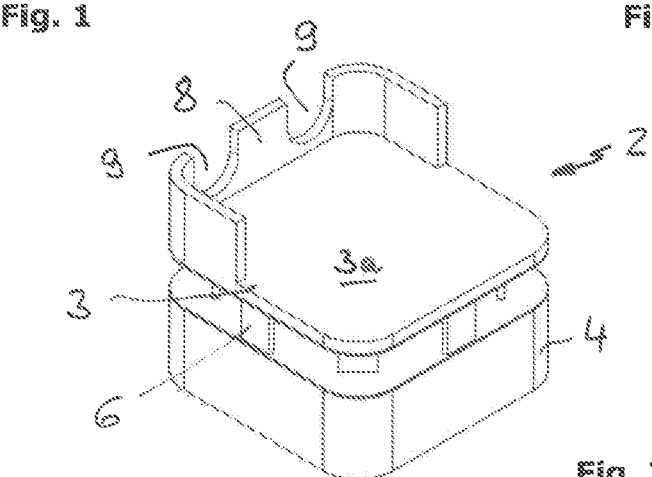
Figure 4:
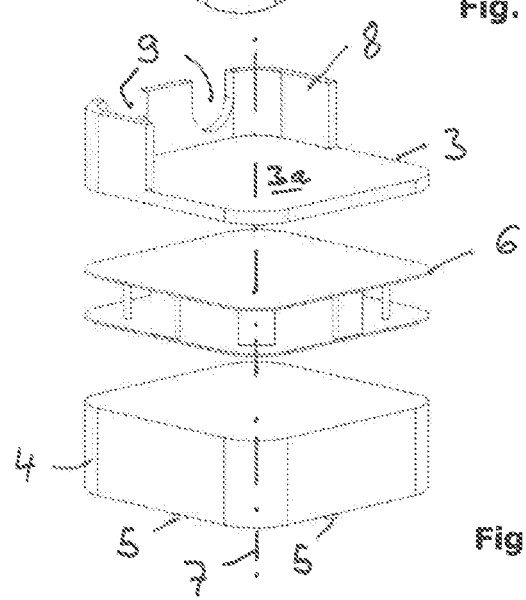

In the embodiment in accordance with FIGS. 3 and 4, the retaining element 8 is also configured in C shape in cross-section, but it has two lateral recesses 9. These recesses 9 allow access to the cargo holder 3 even from the side on which the retaining element 8 is situated.

Furthermore, the retaining element 8 can also be configured so that it can be lowered at least to the level of the surface 3a of the cargo holder 3. For this purpose, in the embodiment in accordance with FIGS. 5 and 6, the retaining element 8 is arranged on the cargo holder 3 so as to pivot; the pivot axis is indicated with 10. Alternatively, the retaining element 8 can also be articulated onto the intermediate body 6 or onto the chassis 4, as long as the chassis 4 is omni-directional.

Figure 5:
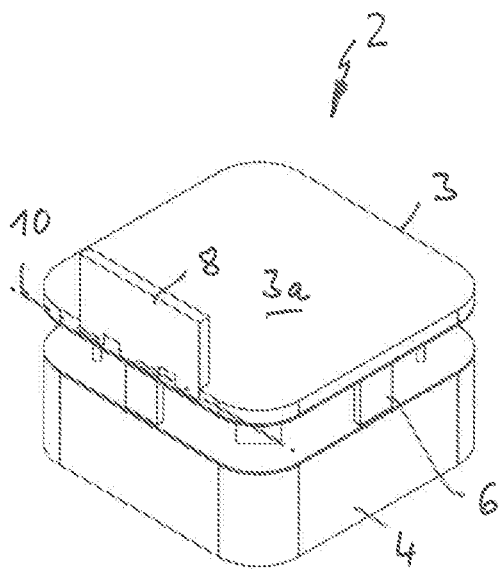
Figure 6:
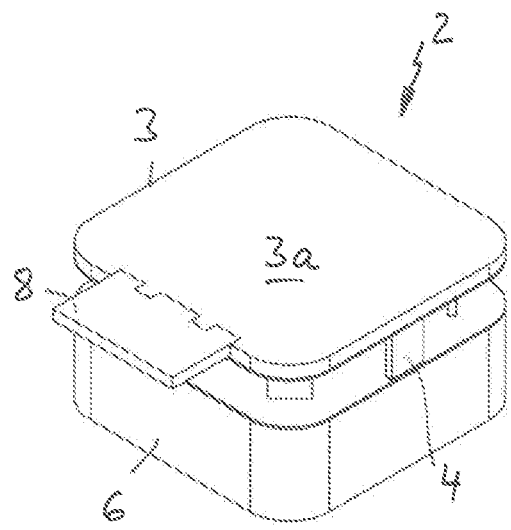

From the travel position shown in FIG. 5, in which the retaining element 8 fulfills its load-securing function, the retaining element 8 can be pivoted down into the position shown in FIG. 6, to the level of the surface 3a of the cargo holder 3, thereby making unhindered access to the cargo holder 3 and thereby to the cargo 1 possible even from the side on which the retaining element 8 is situated.

Figure 7:
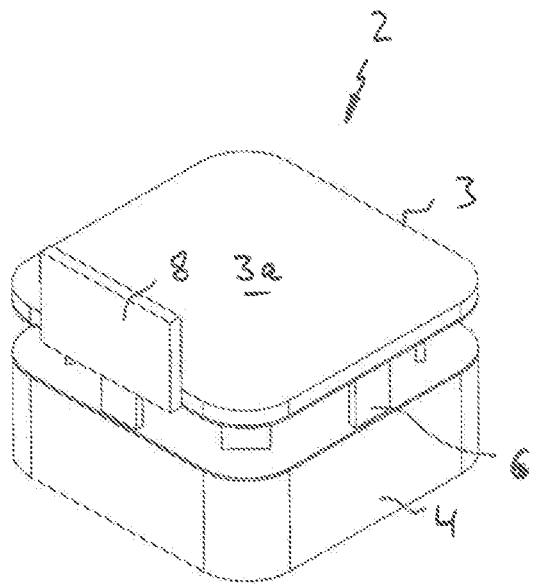
Figure 8:
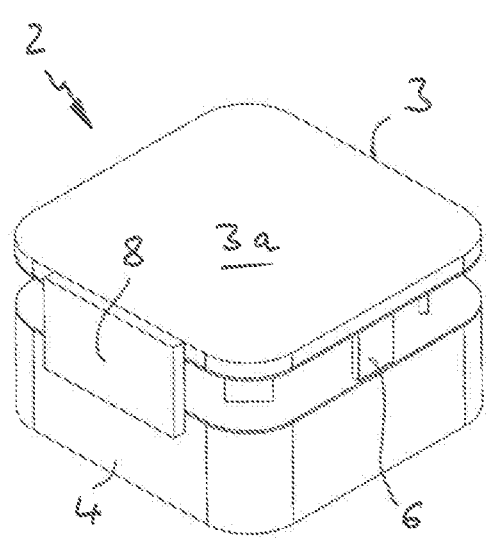
Figure 9:
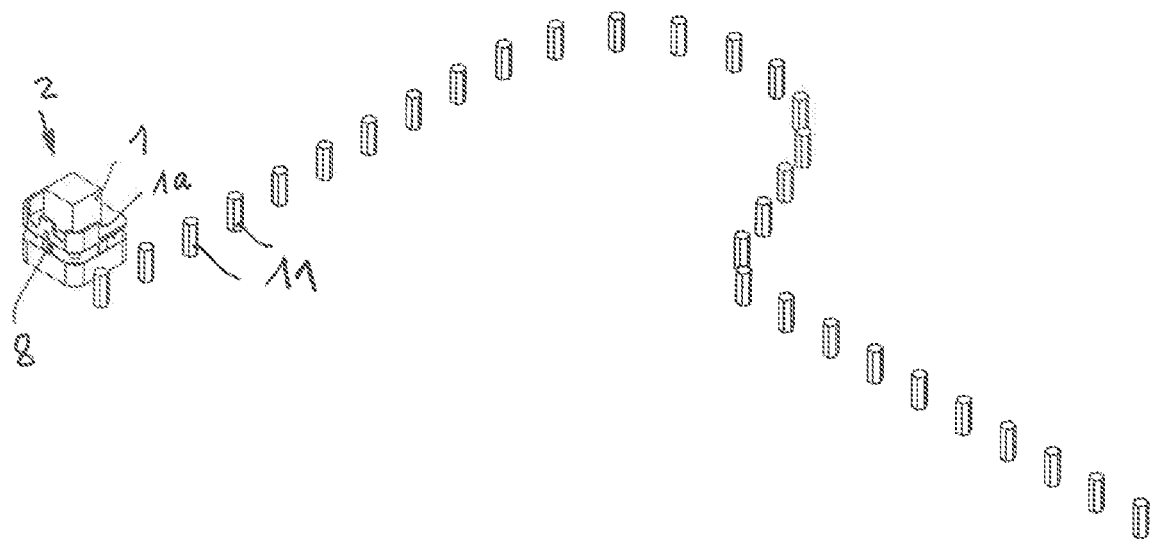

Alternatively, according to the embodiment in accordance with FIGS. 7 and 8, it can be provided that the retaining element 8 is arranged on the cargo holder 3 so as to be vertically displaceable. The retaining element 8 can then be vertically lowered out of the cargo-securing position or travel position in accordance with FIG. 7, and is then in the position shown in FIG. 8. Alternatively, the retaining element 8 can also be arranged on the intermediate body 6 or on the chassis 4 so as to be vertically displaceable, as long as the chassis 4 is omni-directional.

The vehicle 1 has a vehicle control system, not shown, as is usual for driverless, self-driving vehicles. The vehicle control system is set up in such a manner that it orients the retaining element 8, on the basis of a current or expected acceleration or deceleration of the chassis 4, in each instance, in such a manner, relative to the current direction of travel, about the vertical axis 7, that the retaining element 8 is situated at least on the side of the cargo holder 3 toward which the cargo 1 moves after overcoming the adhesion friction between the surface 3a of the cargo holder 3 and the contact surface 1a of the cargo 1. For this purpose, the vehicle control system controls the pivot drive, not shown, which can rotate the cargo holder 3 relative to the chassis 4 or the intermediate body 6 about the vertical axis 7.

Alternatively, it can also be provided that the chassis 4 is an omni-directional chassis. In this case, the vehicle control system controls the travel wheels or castors 5 of the chassis 4 accordingly, so that the chassis 4 itself rotates about the vertical axis 7, into the required position, with the result that the retaining element 8 is then in the correct position without a relative rotation with regard to the chassis 4.

Fundamentally, it is also possible that only the retaining element 8 is configured so that it can rotate relative to the cargo holder 3, about the vertical axis 7.

The correct positioning of the retaining element 8 as a function of the route can be implemented in different ways. The vehicle control system can determine the acceleration or deceleration that is expected, in each instance, from a route that is known to the vehicle control system. In this regard, it is possible that only one destination is input into the vehicle control system. Then the vehicle control system itself determines the route and the accelerations or decelerations expected from it.

Alternatively, the entire route can also be input into the vehicle control system or stored in its memory. From this known route, the vehicle control system then determines the accelerations or decelerations to be expected, in each instance, and controls the retaining element 8 so as to bring it into the currently required rotational position, in each instance.

In addition or alternatively, the vehicle control system can be connected with an acceleration sensor arranged on the vehicle 1, which sensor is not shown. The vehicle control system then controls the orientation of the retaining element 8 on the basis of the current acceleration or deceleration, as detected by the acceleration sensor, in each instance.

For further clarification, different travel states are shown in FIGS. 9 to 12, wherein the route of the vehicle 1 is shown by means of side posts 11, which are indicated. In the travel position in accordance with FIG. 9, the vehicle 2 travels straight ahead and accelerates. On the basis of this acceleration, the cargo 1 has the tendency to move toward the rear on the cargo holder 3. For this reason, in this position the retaining element 8 is arranged in such a manner that it is situated on the rear side of the vehicle 1.

Figure 10:
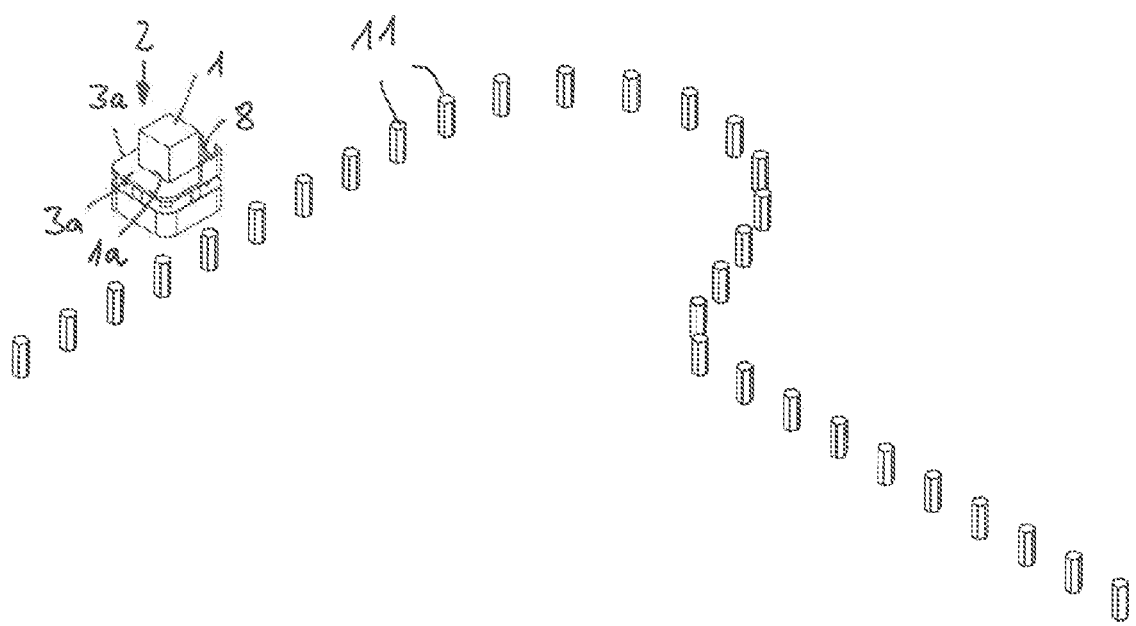

FIG. 10 shows a travel position without acceleration or deceleration, i.e. in normal travel. In this position, the retaining element 8 is situated on the front side of the cargo holder 3, so that in the event of a sudden braking process or collision process, the cargo 1 cannot fall down at the front.

Figure 11:
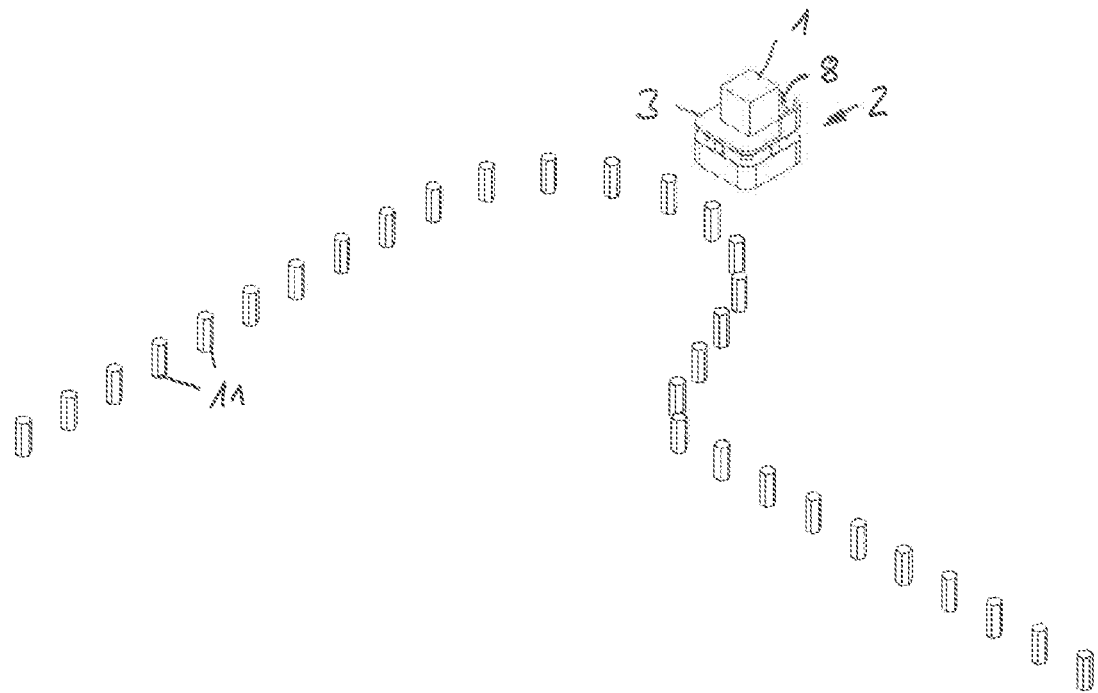

FIG. 11 shows travel along a curve. During travel along a curve, the retaining element 8 is situated on the outer curve side of the cargo holder 3, while during travel along a curve, after overcoming the adhesion friction, the cargo 1 has the tendency, on the basis of centrifugal force, to move radially outward.

Figure 12:
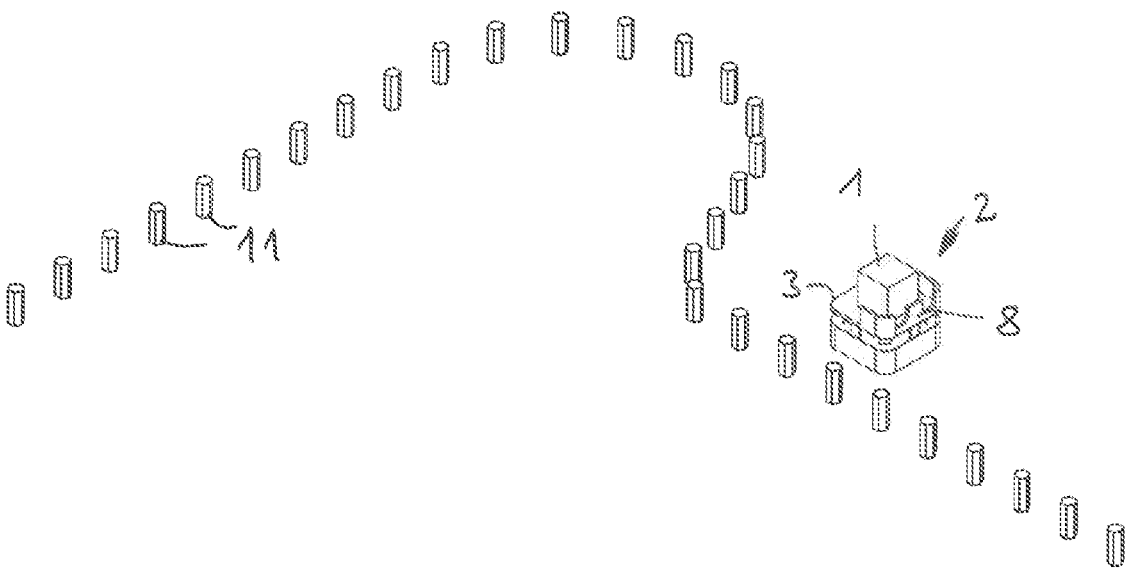

FIG. 12 shows a travel situation in which travel along a curve has ended, and the vehicle 1 is traveling normally straight ahead once again. In this position, the retaining element 8 is situated at the front, once again.

Of course the invention is not restricted to the exemplary embodiments shown. Further embodiments are possible without departing from the basic idea. The retaining element 8 can also be an integral component of the cargo holder 3, which is then configured in one piece. The holder is then configured in a cup shape, for example, wherein the formed-on retaining element 8 extends only over a partial region of the circumference of the cargo holder 3.

REFERENCE SYMBOL LIST

1 cargo
1*a* contact surface
2 vehicle
3 cargo holder
3*a* surface
4 chassis
5 castors
6 intermediate body
7 vertical axis
8 retaining element
9 recesses
10 pivot axis
11 side post

The invention claimed is:

1. A vehicle for transporting cargo (1), having a cargo holder (3) that is arranged on a chassis (4), wherein the cargo holder (3) has a retaining element (8) that secures the cargo (1) at the edge of the cargo holder (3), and wherein a vehicle control system is provided,
wherein
the retaining element (8) extends only over a partial region of the circumference of the cargo holder (3) and is configured so as to rotate about a vertical axis (7), wherein the vehicle control system is set up in such a manner that it orients the retaining element (8), on the basis of a current or expected acceleration or deceleration of the chassis (4), in each instance, relative to the current direction of travel, about the vertical axis (7), in such a manner that the retaining element (8) is situated at least on the side of the cargo holder (3) toward which the cargo (1) moves after overcoming the adhesion friction between the surface (3*a*) of the cargo holder (3) and the contact surface (1*a*) of the cargo (1).

2. The vehicle according to claim 1, wherein
the cargo holder (3) can be rotated about the vertical axis (7), relative to the chassis (4).

3. The vehicle according to claim 1, wherein
the chassis (4) is an omni-directional chassis.

4. The vehicle according to claim 1, wherein
the vehicle control system determines the acceleration or deceleration to be expected, in each instance, from a route known to the vehicle control system.

5. The vehicle according to claim 1, wherein
the vehicle control system is connected with an acceleration sensor arranged on the vehicle (2), and controls the orientation of the retaining element (8) on the basis of the current acceleration or deceleration, in each instance, as determined by the acceleration sensor.

6. The vehicle according to claim 1, wherein
the retaining element (8) is configured so that it can be lowered at least to the level of the surface (3*a*) of the cargo holder (3).

7. The vehicle according to claim 6, wherein
the retaining element (8) is articulated onto the cargo holder (3) or the chassis (4) so as to pivot.

8. The vehicle according to claim 6, wherein
the retaining element (8) is arranged on the cargo holder (3) or the chassis (4) so as to be vertically displaceable.

9. The vehicle according to claim 1, wherein
the retaining element (8) is configured in C shape or rib shape in cross-section.

10. The vehicle according to claim 1, wherein
the retaining element (8) is configured in multiple parts.

* * * * *